(12) United States Patent
Levy et al.

(10) Patent No.: US 6,505,667 B2
(45) Date of Patent: Jan. 14, 2003

(54) LOUVER LAMINATED WITH A VERY THIN FILM

(76) Inventors: Daniel Levy, 6795 Korczak Crescent, #1206, Côte St-Luc, Montréal, Québec (CA), H4W 2W7; Angelo Cianci, 1695 Islemere, Laval, Québec (CA), H7Y 2A4

( * ) Notice: Subject to any disclaimer, the term of this patent is extended or adjusted under 35 U.S.C. 154(b) by 0 days.

(21) Appl. No.: 09/772,488

(22) Filed: Jan. 29, 2001

(65) Prior Publication Data

US 2001/0004004 A1 Jun. 21, 2001

Related U.S. Application Data

(62) Division of application No. 09/200,762, filed on Nov. 27, 1998, now Pat. No. 6,192,964.

(51) Int. Cl.⁷ .................................................. E06B 3/08
(52) U.S. Cl. ..................................................... 160/236
(58) Field of Search ............................ 160/236, 173 R, 160/168.1 R, 900, 178.1 R; 49/92.1

(56) References Cited

U.S. PATENT DOCUMENTS

| | | | |
|---|---|---|---|
| 2,229,225 A | 1/1941 | Schneider | 156/17 |
| 3,645,317 A | * 2/1972 | Malone | 160/236 |
| 4,336,834 A | * 6/1982 | Schaller | 160/236 |
| 4,884,615 A | * 12/1989 | Hsu | 160/236 |
| 5,121,785 A | * 6/1992 | Ohsumi | 160/236 |
| 5,996,672 A | * 12/1999 | Kotin | 160/236 |
| 6,006,816 A | * 12/1999 | Biro et al. | 160/236 |
| 6,192,964 B1 | * 2/2001 | Cianci et al. | 160/236 |

FOREIGN PATENT DOCUMENTS

| | | |
|---|---|---|
| DE | 296 04 691 | 7/1996 |
| FR | 2674170 | 9/1992 |

* cited by examiner

Primary Examiner—David M. Purol
(74) Attorney, Agent, or Firm—Bourque & Associates, P.A.

(57) ABSTRACT

A louver laminated with a very thin film (i.e. a transfer film, very thin layer, etc . . . ) for use in the construction of window blinds such as Venetian blinds, and the like, the louver having opposed top and bottom surfaces, as well as opposed first and second side surfaces each laminated with a very thin film. More particularly, the film is so thin, that the boundary edges of the film, once laminated to a surface of the louver, are imperceptible to human touch, i.e. they are tactilely invisible. An apparatus and method for making a louver laminated with a very thin film is further proposed.

16 Claims, 7 Drawing Sheets

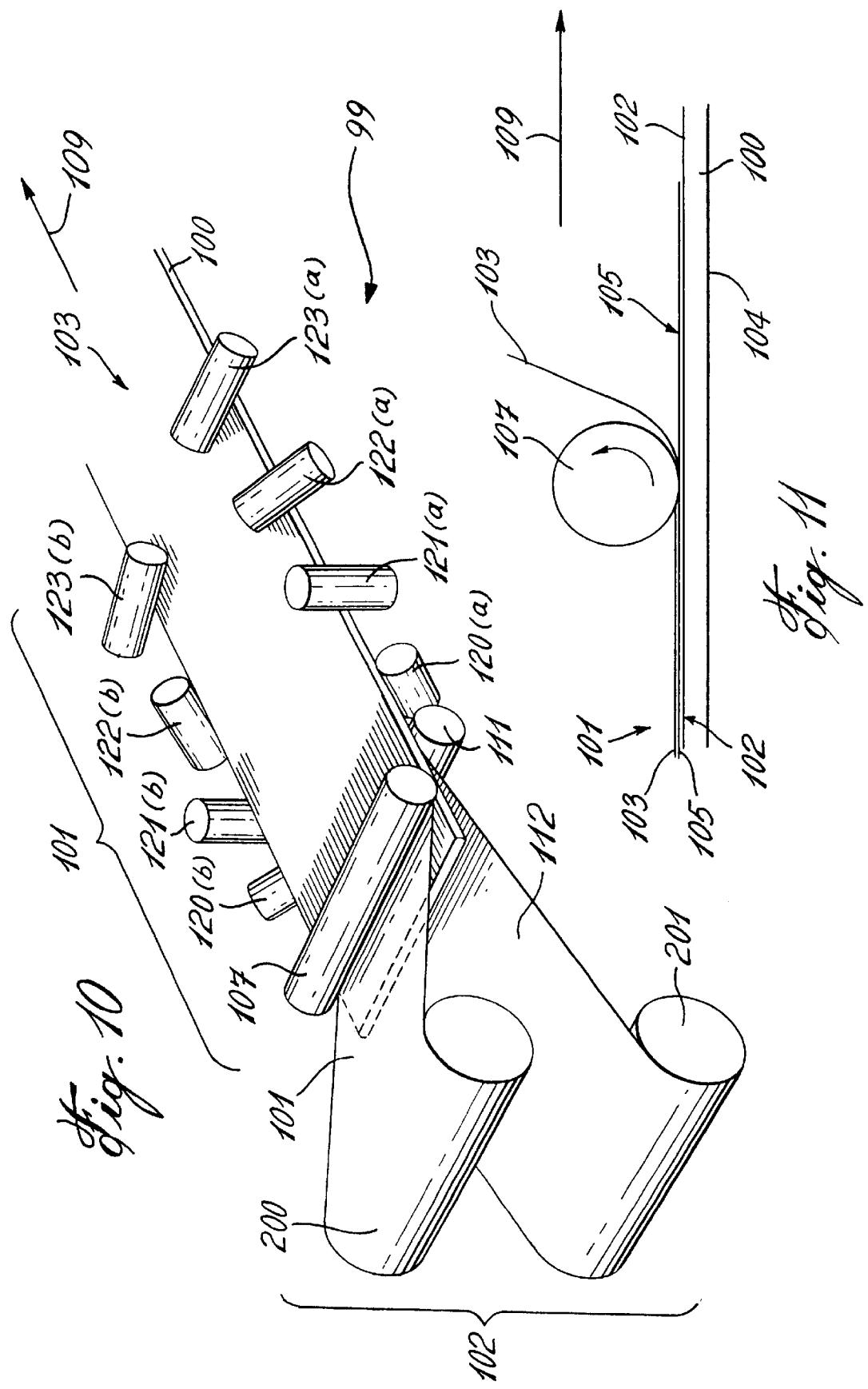

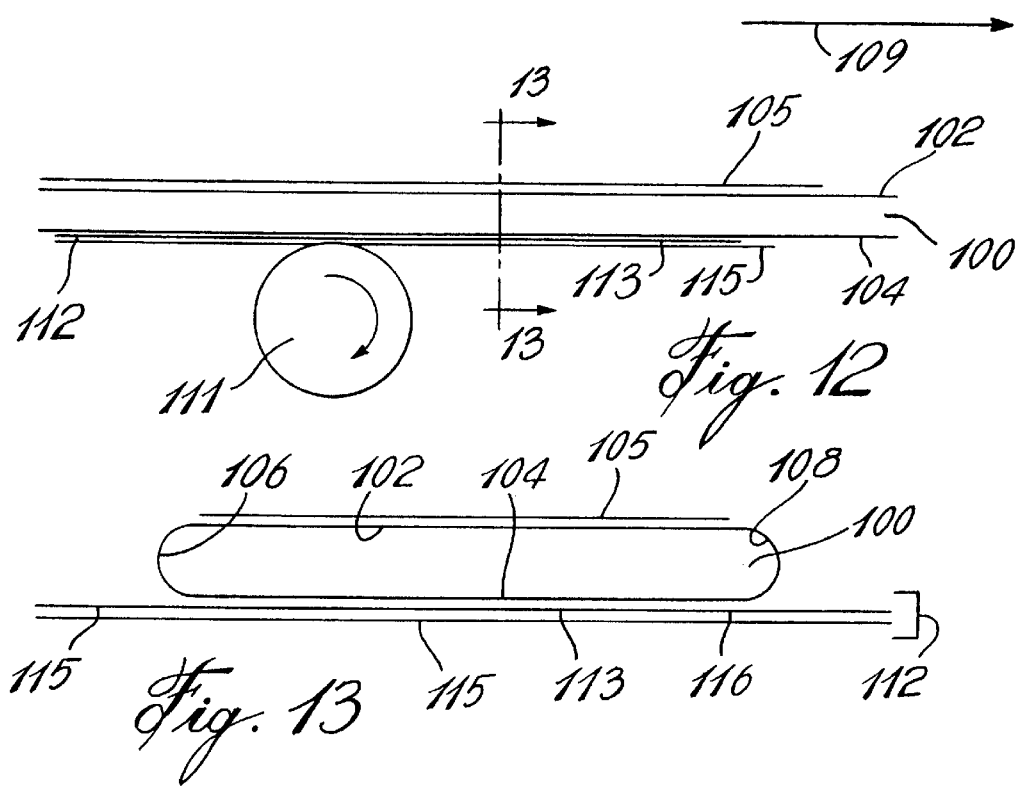
*Fig. 12*
*Fig. 13*
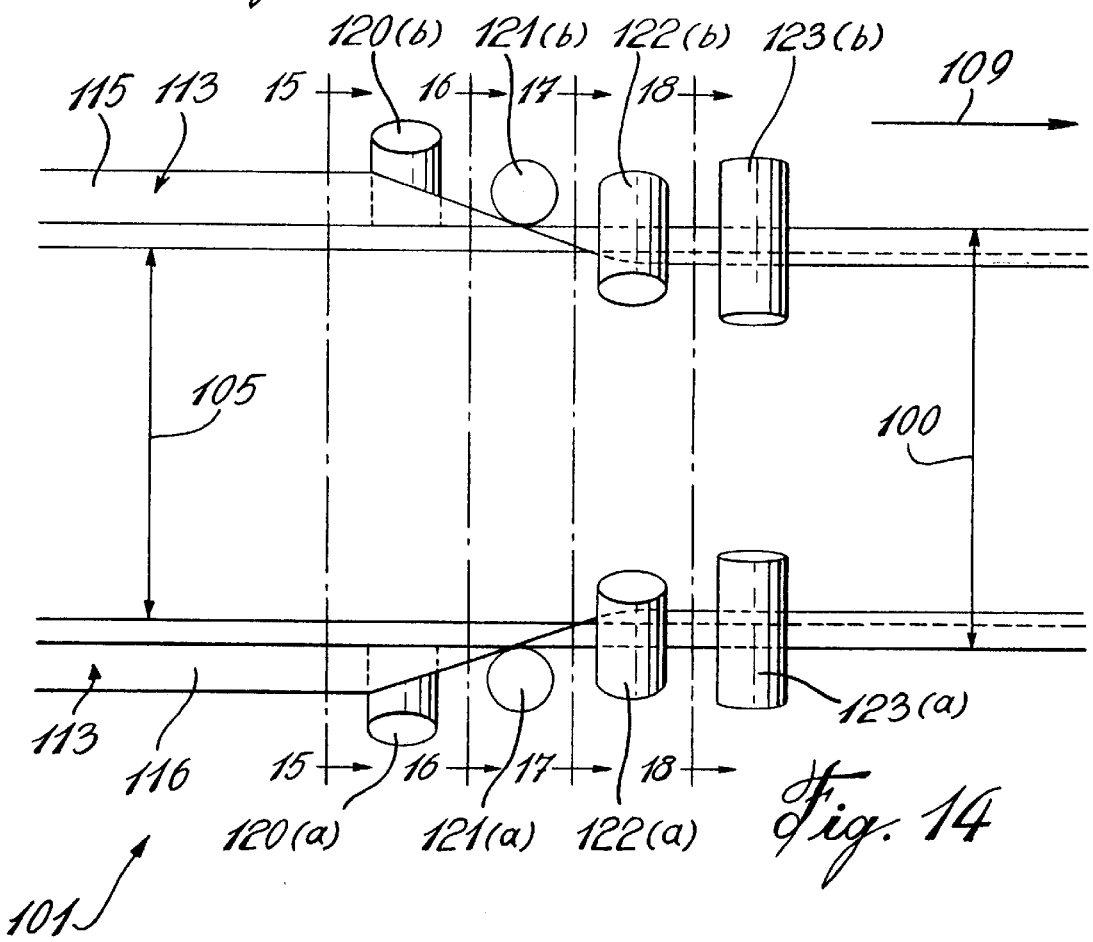
*Fig. 14*

LOUVER LAMINATED WITH A VERY THIN FILM

This application is a Divisional of U.S. patent application No. 09/200,762, filed Nov. 27, 1998 now U.S. Pat. No. 6,192,964 and claims the benefit of this earlier filing date under 35 USC Section 120. The subject matter claimed herein is the result of a restriction requirement and belongs in class 160, subclass 173.R.

FIELD OF THE INVENTION

The present invention relates to a louver laminated with a film (i.e. a transfer film, very thin layer, etc . . . ) for use in the construction of window blinds and the like, wherein opposed top and bottom surfaces, as well as opposed first and second side surfaces of the louver are each laminated with a film. More particularly, the present invention relates to a louver laminated with a film that is so thin, that the boundary edges of the film, once laminated to a surface of the louver, are imperceptible to human touch, i.e. wherein the boundary edges are tactilely invisible. Further, the present invention relates to a louver laminated with a film that is so thin that, where the film overlaps an underlying layer of film, the overlap is not visible to the naked human eye, and is imperceptible to the human touch. The present invention further relates to an apparatus and method for making a louver laminated with a film.

BACKGROUND OF THE INVENTION

Windows, and other openings are often fitted with blinds to keep out light and/or prying eyes. These blinds may comprise a series of spaced apart louvers (or slats, vanes, etc . . . ), which, when assembled as a group, are often known as, for example, Venetian blinds, etc . . . The spaced apart louvers may be disposed horizontally or vertically, and may be supported on one or more rails, brackets, etc . . . to allow the longitudinal displacement and/or the rotation thereof.

Known louvers may be made of metal, vinyl, wood or other suitable material, and for aesthetic and decorative purposes, may be coloured or painted to a desired finish. Known louvers may also be covered with fabric or other types of material so as to create a composite louver, or may otherwise be decorated in any known manner.

Louvers which are covered with material or fabric are known in the art, for example, U.S. Pat. No. 5,613,542 to Tuzmen, U.S. Pat. No. 5,049,424 to Carden, and U.S. Pat. No. 4,049,038 to Hyman. However the use of fabric or material to construct a composite louver may create a bulky and unappealing looking louver, and the texture of the fabric may not lend itself to a smooth finish or a natural looking finish. Further, material or fabric covered composite louvers may be limited by the type and styles of the material which may be suitable to cover the louver, and also by the means of adhesion required to hold the material or fabric to the louver. In addition, due to the fact that two different materials are used to make these composite louvers, i.e the louver itself and the material or fabric covering it, and because during the construction and use of the composite louver they may be exposed to a wide range of temperatures and humidity, the louver and the material covering it may expand and contract at different rates causing warping, distortions, wrinkling and other unsightly blemishes.

In addition, known composite louvers often have rough or raised boundary edges where the base material of the louver and the fabric covering the louver meet. This may be considered unsightly, and may not meet with consumer approval. For example, known composite louvers may have lateral flanges, beads, bumps or raised surfaces where the material covering the louver may be attached to, or captured by the louver body, thus creating an unsmooth surface on the louver. Further, the use of fabric or material to cover a louver, even fabric that is thin, may create an unsightly bulge at the boundary edge or edges thereof, especially where the fabric overlaps, i.e. where the fabric wraps around the louver and overlaps any previously applied fabric. This bulge may be visible to the naked human eye, and may also be felt through human touch. This may further increase the bulky look of the composite louver, and add to the lack of appeal of such composite louvers with consumers due to their not looking natural, i.e. not looking for example, like natural wood. Also, if the material or fabric covering the louver does not fully wrap around and cover the louver, or if it imperfectly wraps around the louver, a seam may show where the boundary edges of the fabric do not perfectly meet, which may cause the base material of the louver underneath to show through, therefore causing an unsightly contrast between the base material and the fabric wrapping it.

Further, known louvers covered with fabric or material, may not be wrapped completely around with material, and may often only be covered on the top and bottom surfaces (for example, of a four sided louver), leaving the lateral, i.e side surfaces of the louver uncovered and therefore showing the base material of the louver itself. This may therefore create an unsightly contrast between the covered top and bottom surfaces and the uncovered side surfaces, thus further not meeting with consumer approval. This may be especially true with very thin lounvers i.e. 0.5 mm thick, and further such very thin louvers cannot be made to look like natural wood louvers. Further, known very thin louvers are known to be laminated with thin material, however, these very thin louvers are often metallic strips, thus making it impossible to duplicate a natural wood look and feel, and the thin material is only applied to the top and bottom surfaces, not the side surfaces.

Therefore, the "feel" and/or the "look" (i.e. the appearance) of known material covered composite louvers may not meet with consumer approval because they may look and feel artificial. This may be especially true for louvers which are made to look as though they are made of natural or laminated wood, A further underlying problem with existing louvers is how to manufacture, on a commercial basis, louvers which, while made with artificial i.e. man-made materials, have the appearance, look and feel of a louver made with a natural material, i.e. for example, wood. In addition, the problem arises of how to change the design from one to another design to another quickly, efficiently and without incurring needless costs. A further problem with present louvers is the fact that material and fabric, while sometimes more expensive, do not give a very finished or high quality appearance.

It would therefore be advantageous to provide a four sided louver laminated with a film, wherein the film covers the first and second opposed top surfaces and the first and second opposed side surfaces, i.e. wherein the four sides of the are laminated (i.e. covered) with a film that is so thin so as to be imperceptible to human touch, i.e. tactilely invisible.

It would further be advantageous to provide a laminated louver wherein each or the longitudinal surfaces are covered i.e. laminated with a material that is so thin that the boundary edges of the material is imperceptible to the unassisted human touch, i.e. tactilely invisible, nor visible to the naked eye.

It would also be advantageous to provide a laminated louver wherein the material covering the louver is so thin that it provides a very realistic look to the finished product, i.e. wherein bulging or bulky seams are avoided.

It would further be advantageous to provide a laminated louver wherein the first and second opposed longitudinal surfaces and the first and second opposed side surfaces of the louver are covered with material so thin that the boundary edges of the material is imperceptible to the unassisted human touch.

It would further be advantageous to provide a laminated louver which allows for different patterns and colours of film to be applied to a louver.

It would be further advantageous to provide a laminated louver which may be laminated with a film in a quick and economical manner.

It would be further advantageous to provide for a bottom rail to be used in the construction of Venetian etc . . . blinds, which bottom rail may be constructed from louvers laminated with a material so thin so as to be imperceptible to human touch.

It would be further advantageous to provide an apparatus for laminating, i.e. covering a louver with a film that is so thin that it is imperceptible to human touch.

STATEMENT OF INVENTION

The present invention, in accordance with one aspect, provides for a louver laminated with a very thin film.

In accordance with this aspect, there is provided for a louver suitable for the construction of a blind, comprising
a louver body,
said louver body comprising opposed, spaced apart, first and second major surfaces and opposed, spaced apart, first and second side surfaces, each said first and second side surface spacing apart said opposed first and second major surfaces wherein said louver body is laminated with a film applied thereto, and
wherein said film is of a thickness such that when it has been laminated to said louver body, the boundary edges of said very thin film are tactilely invisible.

In accordance with a further aspect, there is provided for
a louver comprising
a louver body,
said louver body comprising opposed, spaced apart, first and second surfaces, wherein said louver body is laminated with a film applied thereto,
wherein said film is of a thickness such that when it has been laminated to said louver body, the boundary edges of said very thin film are tactilely invisible.

In accordance with yet a further aspect, there is provided for a
louver suitable for the construction of a blind, comprising
a louver body,
said louver body comprising opposed, spaced apart, first and second major surfaces and opposed, spaced apart, first and second side surfaces, each said first and second side surface spacing apart said opposed first and second major surfaces wherein said louver body is laminated with a film applied thereto, and
wherein said film is of a thickness such that when it has been laminated to said louver body, the boundary edges of said film are imperceptible to human touch.

In accordance with yet a further aspect, there is provided with
a louver suitable for the construction of a blind comprising
a louver body,
said louver body comprising opposed, spaced apart, first and second major surfaces and opposed, spaced apart, first and second side surfaces, each said first and second side surface spacing apart said opposed first and second major surfaces, said first and second major surfaces and said first and second side surfaces being smooth and devoid of bumps or flanges wherein said louver body is laminated with a heat transfer film applied thereto, and
wherein said heat transfer film is of a thickness such that when it has been laminated to said louver body, the boundary edges of said heat transfer film are tactilely invisible, and said opposed first and second major surfaces and said opposed first and second side surfaces each being fully laminated with said heat transfer film.

In accordance with a general aspect, a louver of the present invention may comprise a louver body, having for example, a generally thin, longitudinally extending configuration. Even though the louver may be thin, it nonetheless has a definite thickness to it, for example it may be 3 mm thick. The louver body may be of a generally rectangular cross-section, and may therefore comprise opposed first and second major (i.e. horizontal) surfaces and opposed first and second side (i.e. vertical) surfaces, wherein each of said first and second side surfaces spaces apart the first and second opposed major surfaces. In accordance with a particular aspect of the present invention, the first and second major surfaces may be (substantially) flat i.e. non curved, and the first and second side surfaces may be curved, such as for example, having a semi-spherical or other curved configuration. Alternatively, the louver body may be configured to have any other cross-sectional shape, and may for example, have an oval cross-sectional configuration. The surfaces of the body may be smooth, or may comprise a pattern, or shape incorporated therein, i.e. for example, through embossing, or other such means. However, the surfaces of the louver body are to be free of flanges, bumps, beads, depressions or other such surface breaks that may cause the louver to have an unatural look or appearance.

The material of construction of the louver body may be of any required or desired material, such as for example a polyvinyl chloride (PVC), styrene, foam PVC, ABS, acetate, acrylic, polyester, polycarbonate, polystyrene, polyurethane, composite material, metal, wood or any other material suitable for use as a louver. The louver body may, for example, be extruded, moulded, stamped or constructed in accordance with any known method, and may comprise more than one material, and be constructed by more than one method of construction. The louver body may comprise a hollow portion, or may be fill throughout. In accordance with a particular aspect of the present invention, the louver body may be extruded through a die, and cut to a required length for later assembly, for example, as a Venetian blind.

In accordance with a general aspect of the present invention, the louver may be laminated, i.e. covered, layered, coated, transferred with, etc. with a film applied thereto. It is to be understood that in accordance with the present invention, the following expressions: laminated, covered, layered, coated, transferred with, etc may be used interchangeably, and refer to the fact that a surface of a louver may have had a film applied thereon such that the film may be permanently applied thereto.

Further, the word "film" is to be understood to comprise not only a film but may also mean a very thin layer, i.e. a microscopically thin layer, wherein said very thin layer is of a thickness such that, when it has been applied to said louver body, the boundary edges of said very thin layer are imperceptible to human touch, i.e. the boundary edges are tactilely invisible. Further, the expression "film" may comprise a transfer film, or a heat transfer film, which may be so thin as to be imperceptible to human touch, or tactilely invisible. The expressions "human touch" is understood to mean an unassisted human touch, i.e. a human touch that is not aided by any form of mechanical, or other device which would enhance the tactile ability or response of a person. As may be further understood, the expressions "imperceptible to human touch" and "tactilely invisible" means that if a person where to touch with one or more fingers, or with any part of the human body, the boundary edge of the very thin layer once it has been applied to the louver body, the person would not feel, or perceive the presence of the very thin layer applied to the louver body. Further, if a person were to run, i.e. move one or more fingers along, or across a boundary edge of the very thin layer once it has been applied to the louver body, the person would once again not feel or perceive the presence of the very thin layer. Thus, as may be understood, the expressions "film" and "very thin layer" may mean that they may be tactilely invisible, or not detectable through the sense of touch.

Therefore, in accordance with the present invention, the film may be a very thin layer of a material, or substrate, which may be suitable for and adapted to be applied (i.e. laminated) to a surface of the louver body. For example, the film may be a very thin layer (or sheet, skin, membrane, pellicle, etc . . . ), having physical and chemical properties required to be applied to, and which may remain permenantly applied to a surface of the body of the louver. The film, once applied to the louver body, may comprise one very thin layer. Alternatively, the film, once applied to the louver body, may comprise more than one layer, for example may comprise a very thin base layer and a very thin outer layer, or further, the layer may comprise a very thin base layer, a very thin outer layer, and one or more very thin middle layers sandwiched between the very thin base layer and the very thin outer layer.

The film may be coloured or pigmented such that it does not allow the louver body to show through the film, and may further be fade resistant, i.e. such that the brightness of the colour may not fade, or at least may not fade much through exposure to sunlight, or other elements. Further, the film may comprise a pattern or patterns so that, when laminated onto the louver, it may impart to the louver a particular finished look or appearance. In accordance with a particular embodiment, the pattern applied to the film may be a simulated wood grain pattern, such as for example, an oak grain pattern or a burl grain pattern. Alternatively, the film may only be partially opaque, or comprise an opaque pattern on only certain parts of the film, such that the material of the louver body may show through portions of the very film in order to create a desired look or appearance.

As mentioned above, the louver may be covered, i.e. laminated with a film transferred or applied thereto. In accordance with a general aspect of the present invention, the film may be applied by being laminated onto a surface of the louver body, i.e. it may be made to be united with the louver body by being superimposed therewith, such that the film may be firmly united with the louver body. As may be understood, depending on the material of the film, or depending on its properties, the film may be applied to the louver body through the use of pressure (i.e. if it is a pressure sensitive material), through the application of beat (i.e. if it is a heat sensitive material), through the use of an adhesive, or through a combination of two or more of these. As may be understood, the process of applying the film to the louver body may be accomplished such that the film may be firmly united with the louver body without any air pockets, or other imperfections which may mar the finished appearance or the realistic look of the louver.

The louver body may be laminated (i.e. may be covered, coated, wrapped, layered, transferred with, plated, etc . . . ) with a film such that only a portion or portions of the louver body may be covered by the film, for example, only the top horizontal surface of the louver. In accordance with this embodiment, strips or swaths of a film may be applied to the louver body in a pattern, or randomly, so as to create a desired or required effect. Alternatively, the louver body may be laminated such that the first and second major (i.e. horizontal) surfaces and the first and second side (i.e. vertical) surfaces may be covered by the film. Finally, every surface of the louver body may be covered by the film, i.e. the first and second major (i.e. horizontal) surfaces and the first and second side (i.e. vertical) surfaces as well as the opposed end surfaces.

As may be further understood, more than one pattern of film may be applied to a louver body, or to a portion of a louver body. For example, a first film of a certain pattern or colour may be applied to a surface of the louver body, and a second film of a different pattern or colour may be applied to the same or to a different surface of the louver body. Further, the different patterns of film may overlap or partially overlap in order to create a required or desired effect, look or appearance.

For example, in accordance with a particular aspect of the present invention, the louver body of the present invention may comprise opposed first and second major (i.e. horizontal) surfaces (for example, 5 cm wide by 100 cm long) and opposed first and second side curved surfaces (for example, 3 mm wide by 100 cm long), wherein each side curved surface spaces apart both major surfaces. A film may be applied to the first major surface (i.e. the top horizontal surface), for example, a film configured to have substantially the same configuration as the fist major surface to which it is to be applied to, but narrower, for example, 4.5 cm wide, by 100 cm long. A second film may then be applied to the second major surface (i.e. the bottom horizontal surface), said second film being configured substantially the same as the second major surface, but being wider, for example, 6.8 cm wide by 100 cm long. As may be understood, the extra width on the second film applied to the second major surface may allow each of the opposed side curved surfaces to also be covered by the same second film, i.e. the second film may be made to wrap around and be applied to the each of the, opposed side curved surfaces. As may be further understood, the second film may further be wide enough, over and above what is necessary to cover both side curved surfaces, so as to overlap the boundary edges of the previously applied first film. As may be understood by this example, the boundary edges of the first film may be overlapped by the boundary edges of the second film, so as to cause the louver body to have each of its four longitudinal surfaces (the two opposed major longitudinal surfaces and the opposed minor curved surfaces) covered by a film, with the louver body as a whole being covered by two separate films.

In accordance with a further embodiment of the present invention, the louver body may be covered with more than two films, for example, may be covered by four films, wherein a first opposed major surface may be covered by a first film, the opposed second major surface may be covered by a second film, the first side curved surface may be covered by a third film, and the opposed second side curved surface may be covered by a fourth film. It is understood that the boundary edges of each of these films may overlap the boundary edge of an adjacent film. Each of the first, second, third and fourth films may identical, or some or all may be different from the others.

In accordance with a particular aspect, the film which may be used to laminate the louver body, may, for example, comprise a transfer film which may be commercially available from Crown Roll Leaf of Paterson, N.J., or from Decorating Resources of Pitman New Jersey. Generally, a (heat) transfer film may comprise four elements, namely in order, an adhesive layer, a pattern layer, a release layer, and a temporary polyester carrier. The purpose of the temporary polyester carrier may be to act as a carrier for the other layers.

Thus, the transfer film may comprise a temporary polyester carrier. This temporary polyester carrier does not form part of the film which is to be laminated onto the louver body, as it may serve only as a temporary carrier for the other elements of the transfer film, and may be peeled away during the lamination process, leaving the other elements of the film (i.e. the very thin layer) laminated onto the louver body.

The transfer film may further comprise (in addition to the temporary polyester carrier) any number of various release layers. These release layers may be gravure printed, or otherwise applied onto one of the surfaces of the temporary polyester carrier. The release layer may comprise resins, waxes, silicones, plasticisers, solvent, etc . . . depending on the end use application. The release layer may be necessary in order to act as a release layer between the temporary polyester carrier and the design coating (to be applied onto the release layer), so as to enable the temporary polyester carrier to be peeled away without harming the design coating. It is understood that if a design layer may be applied directly to the temporary polyester carrier such that the temporary polyester carrier can be peeled away without affecting the design layer, then the use of a release layer may not be necessary.

Further, a design coating may be printed onto the dry surface of the release layer by a suitable printing process, such as gravure, silk screen, flexographic, etc . . . The design coating may be multicolored, single coloured, comprise patterns, figures, stripping, etc . . . In accordance with a particular aspect, the design coating may for example, comprise a wood grain pattern, such as for example an oak grain pattern, or a burl grain pattern. It is understood that more than one pattern, colour, etc . . . may be included in a given design coating. The printing inks which may be used to apply a design coating onto the release layer may be formulated with a given end product application in mind, such as light fastness and abrasion resistance. An example of these printing inks is a vinyl based ink.

Finally, an adhesive coating may be applied onto the design coating, thus completing the film. It is understood that a number of different adhesive coatings may be used depending on the material onto which the film is to be applied to. In accordance with an additional embodiment, the adhesive coating pay be a heat activated adhesive coating. In accordance with a further embodiment, the film as described above may not comprise an adhesive coating at all. As may be understood, when the material of construction of the louver body is PVC, and when a vinyl ink is used in the film, i.e applied to the release layer, the film may be laminated to the body of the louver directly through the use of heat and/or pressure rollers, without need for an adhesive to bond the film to the louver body.

As stated above, in accordance with present invention, a louver may be laminated with a film applied thereto, wherein the word film is to be understood to composed not only a film, but also a very thin layer. In accordance with a particular embodiment of the present invention, the very thin layer applied to the louver body may be (once the temporary polyester carrier has been peeled away) of a thickness of between 1 to 25 microns thick. (i.e. wherein a micron is $1 \times 10^{-6}$ metre. In accordance with a particular embodiment of the present invention, the very thin layer, when applied to the louver body, may be of a thickness of between 2 to 8 microns thick. In accordance with a further particular embodiment of the present invention, the very thin layer as applied to the louver body may be of a thickness of 5 microns.

The release layer, together with the design coating (i.e. the printed image), and the adhesive layer (when there is one) may be transferred, from the temporary polyester carrier, as a unit, onto the louver body. This may be achieved by the action of heat and/or pressure applied to the back surface of the temporary polyester carrier, (i.e. the surface that does not have applied thereon the design coating) while the adhesive surface may be brought into contact with the louver body. As pressure and/or heat may be applied to the back surface of the temporary polyester carrier, the polyester carrier may be peeled away from the rest of the film, leaving the other layers firmly laminated to the surface of the louver body.

When the film is to be applied to the louver body, the heat transfer film may be placed with the adhesive layer in contact with the body of the louver. Heat may be applied to the film, either through the application of radiant heat (i.e. through the blowing of hot air), through the use of heated rollers, or through any other known method. The heat that may be applied may activate the adhesive layer such that the design layer may be transferred from the temporary polyester carrier to the louver body, such that it adheres to the louver body. In order to ensure that the thin film is properly bonded to the body, the use of rollers, heated or otherwise may be used to firmly press the film in adhesive contact with the louver body. As the design layer is being adhered to the louver body, the temporary polyester carrier may be simultaneously be peeled back and away from the thin film.

In order to accomplish an effective transfer of the film unto the louver body, pressure may be applied to the back surface of the temporary polyester carrier for a dwell period of 0.5 to 1 second. This pressure may be applied through the use of a vertically acting press, i.e. a press which applies pressure perpendicularly to the surface of the louver body. Alternatively, the lamination of the film onto the louver body may be accomplished through the use of a roll on press. According to this method, a louver body may be advanced, for example, at a speed of 15 to 20 feet per minute through a series of rollers which apply pressure, such that the film may be laminated onto the surface or surfaces thereof. It is understood that, depending on the type of adhesive used, temperatures of the order of 200 to 300 Fahrenheit (104 to 149 degrees Celsius) when the film is to be applied to a metal base, and 250 to 425 degrees Fahrenheit otherwise (121 to 218 degrees Celsius) may be used. Thus, the rollers themselves may be heated, or ambient temperature may be used. In addition, the application of the film to the louver body may be done right after the louver body is extruded from a die, which may normally mean that the louver body is at an elevated temperature. Thus the combination of the temperature of the louver and of the temperature of the rollers may combine to effect an effective transfer.

In accordance with the present invention, it is understood that the expression "seamless" is to be understood to mean that there is an actual seam between one boundary edge of a thin film and an overlapping boundary of a thin film, but that said overlap is so thin, that it is not visible to the naked human eye, and that it is not detectible by human tough. In accordance with a particular embodiment of the present invention, the thin film deposited on the louver body may have a thickness of five (5) microns ($1 \times 10^{-6}$ of a metre).

Venetian blind assemblies often are provided with a bottom rail, which may among other things, add weight to the Venetian blind such that the louvers disposed above the rail may be weighed and pulled downwardly. Therefore, in accordance with another embodiment of the present invention, there is provided for:

a bottom rail suitable for use in the construction of a blind comprising
a hollow rectangular box, wherein said hollow rectangular box is constructed from opposed first and second louvers and opposed, spaced apart third and fourth louvers, wherein each third and fourth louver spaces apart said first and second louver.

In accordance with this further embodiment of the present invention, there is provided for a composite rail suitable for use as a bottom rail in the construction of a finished Venetian blind. More particularly, the composite rail itself may be constructed from a number of louvers, either laminated louvers as described herein above, or non-laminated louvers.

In order to have a Venetian blind which has a bottom rail which matches the design of the louvers as closely as possible, the bottom rail may be constructed from laminated louvers, i.e. for example, laminated louvers which are specifically laminated for use in the construction of a rail, or scrap louvers which may be recycled and used in the construction of a rail. Therefore, in accordance with a particular embodiment, the composite rail may comprise one or more laminated louvers, laminated as described above. As may be understood, the laminated louver used in the construction of the rail may be laminated on all of its surfaces, or alternatively, laminated on only some or one surface, for example on the surface which, when the louver has been incorporated into the composite rail, is visible.

In accordance with this embodiment, a number of louvers, some or all of which may have been laminated as explained above, may be cut to a suitable length, for example, to a length to match the length of the louvers to be assembled as a Venetian blind. The louver may then be assembled into a hollow longitudinal box, by fastening or connecting (for example, gluing) a first louver along one of its longitudinal edges, to a longitudinal edge of a second louver so as to form an approximately L-shaped angle. Further, a third louver may be fastened along one of its longitudinal edges to this L shaped angle so as to now form an approximate U-shaped channel. Finally, a fourth louver may be fastened to the legs of said U shaped channel so as to close the U, and complete the hollow longitudinal box.

The fastening of a louver to each of its adjacent louvers may be accomplished along the outermost edges thereof. Alternatively, the longitudinal edges of each of the louvers may be provided with a 45° cut or face in the longitudinal direction of the of the louver. Therefore, the louvers may then be made to abut each other such that on of the 45° faces of a louver may engage a 45° face of an adjacent louver, thus forming a 90° angle. As may be understood, this may be repeated such that each of the corners of a bottom rail may be at a 90° angle. In accordance with a further embodiment, it is understood that the composite rail as described above may not be an equal sided longitudinal box, inasmuch as two opposed sides may be shorter than the remaining opposed sides, therefore creating a rail having a rectangular cross-section.

In accordance with a further embodiment, a composite bottom rail, may be constructed from louvers which may have been machined, i.e. which may have been cut to a particular size, etc . . . For example, a laminated louver may comprise on one of its major (i.e. longitudinal surfaces) a pair of opposed first and second longitudinal grooves disposed parallel to the major longitudinal axis of the louver. The grooves in question may be disposed adjacent to the side surfaces of the louver, or may be disposed spaced away from the side edges. The louver thus configured may be the bottom component of the rail. Further, an additional louver may be cut into a number of sections, i.e. into two sections, with each section having its rounded edge also cut off, so as to have a narrow rectangular louver. Each of these narrow rectangular louver may then be snugly fitted into a respective groove of the above louver, therefore creating a U-shaped channel. Finally, a louver comprising on one of its major (i.e. longitudinal surfaces) a pair of opposed first and second longitudinal grooves disposed parallel to the major longitudinal axis of the louver may be fitted on the legs of the above created U-shaped channel, such that each leg may be snugly fitted into a respective groove, thus closing the U shaped channel, and completing the hollow longitudinal box. Prior to closing of the hollow longitudinal box, there may be placed and secured therein a weight, such as a strip of metal, in order to further weigh down the rail, if necessary. Further, in order to enhance the sturdiness of the bottom rail, the connections between the parts of the louver may be glued. It is understood that the above described embodiment may not necessarily be constructed with laminated louvers, but may be constructed with louvers which are not laminated.

In accordance with a further embodiment of the present invention, there may be provided for a tassel, suitable for use as an end member to be hanged at the end of the strings which may be used to pull open the Venetian blind. constructed with a laminated louver. In order to have a Venetian blind which has one or more of its tassels which matches the design of the louvers as closely as possible, the tassels may be constructed from louvers, i.e. for example, laminated louvers which are specifically laminated for use in the construction of a rail, or scrap louvers which may be recycled and used in the construction of a rail. It is also understood that the louver in question may not be necessarily laminated.

The tassels may be constructed from.a piece of a louver, wherein a groove may have been cut onto one of the major longitudinal surfaces thereof, i.e. adjacent one of the side surfaces. Further, a series of 45° cuts or grooves may have been made on the same major longitudinal surface of the louver, but disposed at 90° to the major axis of the louver. The depth of the 45° cuts is such that a sufficient quantity of material of the louver is remove, thus creating a hinge at the location of the 45° cuts, yet sufficient material is left to ensure the sturdiness of the hinge.

As may be understood, a piece of louver configured as above, comprising three 45° cuts, which may be equally space apart, may be folded at each of the three hinges, thus creating a four sided box. Prior to closing the box, a square piece of louver, cut to suit, may be incorporated into the groove, and thus acting as a bottom member for the tassel.

The louver laminated with a film as disclosed in the present invention may be used in the assembly of a complete Venetian blind (or other blind system) after the louvers are individually laminated with the desired film. Such blind systems may comprise a series of spaced apart louvers (also known as slats, vanes etc . . . ) which may be disposed vertically or horizontally. The louvers may be supported from one or more rails (or channels, support member, brackets etc . . . ) which may be affixed, for example, to a wall adjacent to a window. The louvers may be hung form the rail by any means, rigid or other wise, such as rods, strings, ropes, chains, etc. The louvers, if disposed horizontally, may be supported at one or more locations along their length, and if disposed vertically, may be supported at each opposed end. The louvers may generally be configured and disposed in order to allow for the displacement and/or the rotation thereof.

Conventional louvers may be adapted for lateral movement, and depending on wether the louvers are disposed vertically or horizontally, the lateral movement may be either vertical movement, i.e. up and down, or horizontal movement. The louvers may therefore be displaceable between an open blind position, i.e. wherein blind is open and the louvers are drawn to one opposite end of a support rail, and a closed position, wherein the blind is closed, and the louvers are disposed in generally equalled spaced relation to one another along the length of a support rail. The louvers may also be adapted for selective rotation about their longitudinal axis between a first open position and a second closed position, wherein when in the second closed position the light passing by the louvers may be is completely stopped.

The louvers may be disposed, for example, on one, or both sides, of an opening, i.e. such as a window, or may alternatively be disposed, i.e. sandwiched between two window panes. Further, the louvers of the present invention may be used in any other applications wherein a seamless laminated louver may be required.

In accordance with a further object of the present invention, there is provided for an improved method and apparatus for the production of a laminated louver, wherein a louver may be laminated with a film, wherein it is understood that said film may be a very thin layer, such as a transfer film, or a heat transfer film.

Therefore, there is provided for an apparatus for laminating a film onto a louver
wherein said louver comprises a louver body, said louver body comprising opposed first and second major surfaces, and opposed first and second side surfaces wherein said apparatus comprises in combination, a delivery station for continuously supplying first and second films to be laminated onto said louver body, and a forming station for laminating said film onto said louver body said forming station comprising a top roller and a vertically spaced apart bottom roller, and further comprising a plurality of pairs of opposed angled rollers, wherein said top roller laminates said first film onto said first major surface, and wherein said bottom roller laminates said second film onto said second major surface, and wherein said plurality of pairs of opposed angled rollers progressively laminate the overhanging edges of said second film onto the respective said opposed side surfaces.

In accordance with a particular embodiment, the method and apparatus of the present invention contemplates continuously delivering of a film (i.e. a very thin layer such as, for example, a transfer film, or a heat transfer film) to a forming station, wherein the transfer film may be transferred, i.e applied, laminated, etc . . . to a surface of a louver body. The forming station may be an independent apparatus, or alternatively, may form part a larger apparatus, for example, may form part of a die machine for the extrusion of the louvers themselves. The forming station may comprise a number of rollers, supports, controls, advancing means, etc. necessary to achieve its intended purpose. As may be understood, the forming station may have as a purpose to cause the design coating of a transfer film (as characterized above) to be transferred onto the surface or surfaces of a louver body.

In accordance with a particular embodiment of the present invention, a louver may comprise a louver body having opposed first and second major (i.e. horizontal) surfaces, and opposed first and second side surfaces, wherein each of said first and second side surfaces may space apart said first and second major surfaces. As may be understood, the louver body may be covered with (i.e. laminated, or applied with) one or more films, on one or more surfaces thereof. In order to facilitate the manufacturing of said film covered louver, i.e. in order to facilitate the application of the film to the louver body, the film may be applied to the louver body in a series of steps, for example, a first step wherein a first film may be applied to the first major surface (i.e. top horizontal surface) and a second step wherein a second film may be applied to the second major surfacc (i.e. lower horizontal surface). The opposed first and second side surfaces may also be covered during the second step, if for example, the width of the second film is cut wider than the width of the lower horizontal surface, and therefore the overhanging portions of the second film may be folded onto the respective first and second side surfaces. It is understood however, that this order of application may be reversed, namely wherein the second thin film may be applied first, and the first thin film may be applied second. However, it is understood that the first and second side surfaces may be laminated with their own individual strips of thin film.

As may be understood, whenever two films may be used to laminate all four lateral surfaces of the louver body, the second of the two films i.e. the film that is applied after the application of the first film, may partially overlap the boundary edges of the firstly applied film. It is further understood, that if more than two films may be applied to the louver body, i.e. for example, four films, the adjacent edge of film that is applied after another film may partially overlap the previously applied film.

Thus, when a film is to be applied to a louver body, said louver body, or a pre-cut length of louver body may be introduce into a forming station. The forming station may comprise a top roller, which top roller may cause pressure and/or heat to be applied to the transfer film, such that the design coating (and also the adhesive coating and the protective layer as described above) may be transferred (i.e. laminated) onto the top horizontal surface of the louver body. Thus, a film (i.e. a transfer film), may be brought into close proximity with the top horizontal surface of the louver body, with its adhesive coating in contact with the top horizontal surface. The louver, with the film in contact with the top horizontal surface, may then be made to advance trough the forming station, such that the top roller may cause the transfer film to be pressed (very) firmly against the top horizontal surface of the louver. The pressure of the roller may be also accompanied by heat, i.e. if the roller is heated or otherwise, the whole depending on the type of transfer film used and the type of material of the louver body. The temporary polyester carrier onto which the design coating was previously printed, may then be peeled away such that said temporary polyester carrier may not form part of the laminated louver. As may be understood, the width of the transfer film as applied to the top horizontal surface may be less then the actual width of the top horizontal surface itself.

Further, in accordance with this particular embodiment, once the first film has been applied to the top horizontal surface, a second film may then be applied to the second opposed major surface (i.e. the lower horizontal surface). As may be understood, the width of the second film may be greater (i.e. wider) than the width of the lower horizontal surface, said excess width being sufficient to also cover the opposed first and second side surfaces. As may be understood, in accordance with this embodiment, the first film may cover the top horizontal surface, and the second film may cover the lower horizontal surface and the opposed first and second side surfaces, Thus, following the application of the first film, the louver body may be further advanced along the forming station, namely to be brought into contact with a bottom roller. The bottom roller may, as described above with respect to the top roller, cause pressure and/or heat to be applied to the second film, which may cause the design coating of the second film to be transferred to the lower horizontal surface. Thus, the second film (i.e. transfer film) may be brought into close proximity or contact with the lower horizontal surface, with its adhesive coating in contact or close proximity to the lower horizontal surface. As the louver body may be advanced trough the forming station, the lower roller applies pressure and/or heat to the second film, such that the design coating may be caused to be transferred onto the lower surface of the louver body. The temporary polyester carrier of the second film may be then pulled and peeled away from the second film so as not to form part of the applied film.

At this stage of the forming station, the second film may have been partially applied, namely the lower horizontal surface has been covered, yet the opposed first and second side surfaces of the louver body are yet to be covered. Thus the louver body may then be advanced to a further position of the forming station, wherein a number of opposed angled side rollers, angled progressively more steeply, which may apply pressure and/or heal to the side portions of the second film such that the side surfaces are progressively covered.

BRIEF DESCRIPTION OF THE DRAWINGS

In drawings which illustrate example embodiment of the present invention:

FIG. 10 is a perspective schematic view of the forming station apparatus for the application of a film onto a louver body.

FIG. 11 is close up side elevation view of the top roller of the forming station.

FIG. 12 is a close up side elevation view of the bottom roller of the forming station.

FIG. 13 is a sectional view of the louver along view lines 13—13 of FIG. 12.

FIG. 14 is a top plan view of the forming station.

DETAILED DESCRIPTION OF THE DRAWINGS

Figure 1:
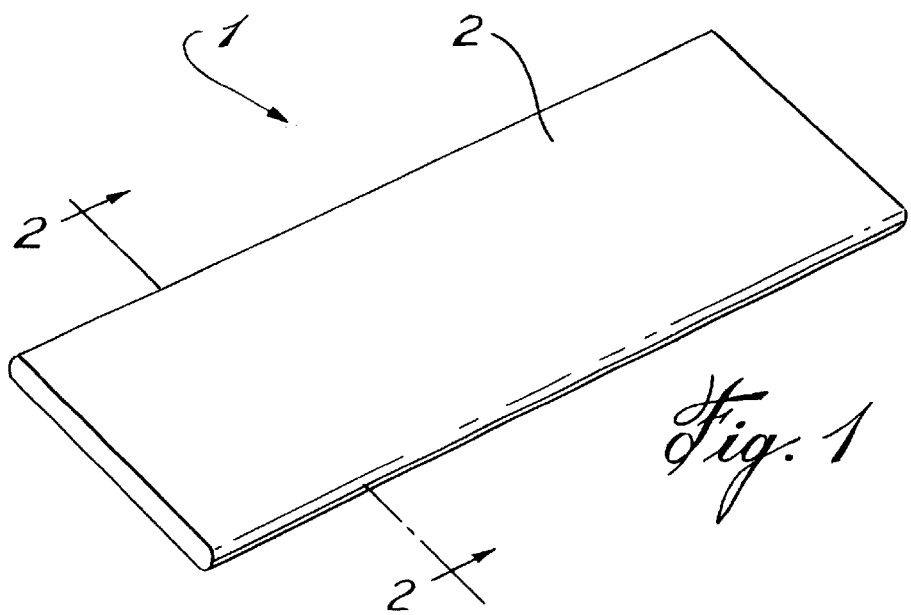
FIG. 1 is a perspective view of a louver covered with a film applied thereto.

FIG. 1 shows a perspective view of a louver 1 having a film 2 applied thereto.

Figure 2:
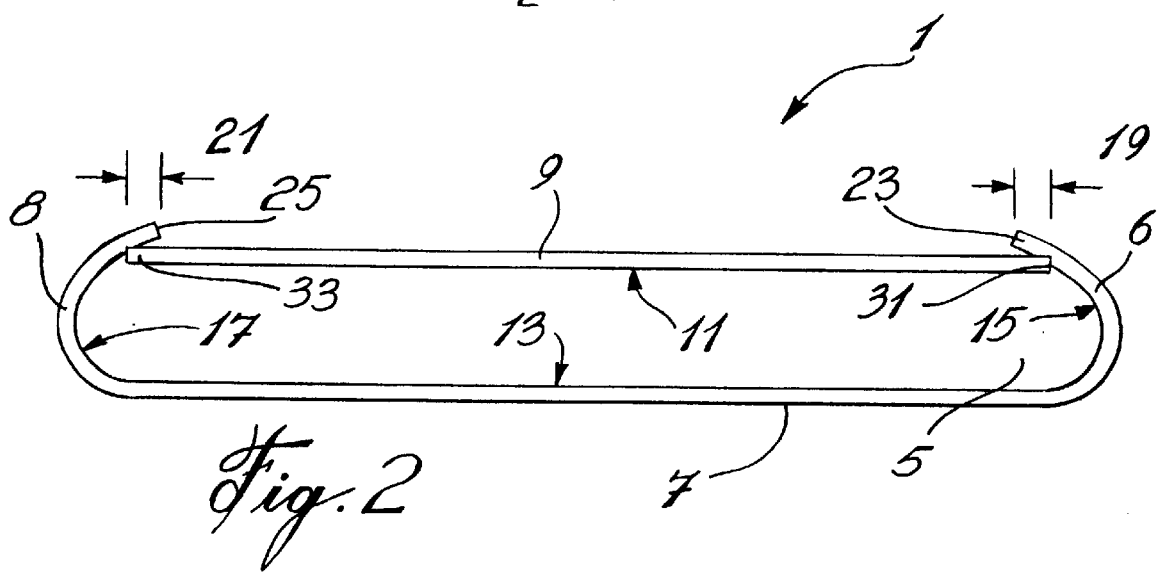
FIG. 2 is a schematic cross sectional view along view lines 2—2 of FIG. 1 showing a cross section of a louver.

FIG. 2 is a schematic cross sectional view along view lines 2—2 of FIG. 1 showing a cross-section of the louver 1. As may be seen, louver 1 comprises a louver body 5, wherein said louver body 5 is laminated with two films, namely first film 9 and second film 7. It is understood that FIG. 2 (as well as FIGS. 3 to 7) is a schematic view of the louver, having a greatly exaggerated scale in order to depict the subject matter of the invention. For example, the vertical scale is in particular, greatly exaggerated, as the film applied to the louver body is of an order of magnitude of 5 microns, which if this film were drawn to scale, would be almost impossible to depict on the louver body 5.

The film of FIG. 2 is shown as having been applied to the louver body 5 as two separate films, namely first film 9 and second film 7. First film 9 is shown as having been applied to the first opposed major surface, i.e. the top horizontal surface 11 of louver body 5, and the second film 7 is shown as having been applied to the second opposed major surface, i.e. lower horizontal surface 13. Further, second film 7 is also shown as having been applied to the first opposed side surface 15, as well as to the second opposed side surface 17 of louver body 5.

As may be seen, in accordance with the embodiment shown in FIG. 2, the order of application of the two films 9, 7 is such that first film 9 is shown as having been applied first onto the louver body 5, i.e. onto the top horizontal surface 11. Following this application, second film 7 was then applied to the lower horizontal surface 13. As may be seen, second film 7 is wider than the width of the louver body 5, and that the extra width of second film 7, namely portion 6 was applied onto the first opposed side surface 15, and portion 8 was applied onto the second opposed side surface 17 respectively. Therefore, each of the four longitudinal surfaces, namely opposed first and second major surfaces 11, 13 and opposed first and second side surfaces 15 and 17 are completed covered (i.e. laminated) with a film (i.e. a very thin layer). It is understood however, the order of application of the first 7 and second 9 films may be inverted, such that the second film 9 may be applied first to the lower horizontal surface 13, and the first film 9 may then be applied to the top horizontal surface 11.

As may further be seen, part of the second film 7 overlaps onto part of the first film 9, namely boundary edges 25 and 23 of portions 8 and 6 of second film 7 are shown to overlap the boundary edges 33 and 31 of first film 9. The overlap distance 19 and 21 respectively may vary. As may be understood, the boundary edge 25 and 23 of the second film 7 may be exposed on the upper surface of film 9. As explained above, as the thickness of film 7, and therefore of boundary edges 23 and 25 are very thin, i.e. for example of the order of 5 microns, said boundary edges are therefore imperceptible to the human touch, i.e. they are tactilely invisible. Alternatively, if the second film 7 is applied first to the lower horizontal surface 13, and the first film 9 is applied afterwards, the boundary edges 31 and 33 of first film 9 may overlap the boundary edges 25 and 23 of the second film 7.

Although not shown, louver body 5 may be produced by an extrusion process (not shown), wherein selected raw materials may be pushed through a die shaped such that the emerging louver body may have a cross sectional shape as shown in FIGS. 1 and 2. As may be seen, the louver body 5 does not comprise any flanges, bumps, beads or so on.

Figure 3:
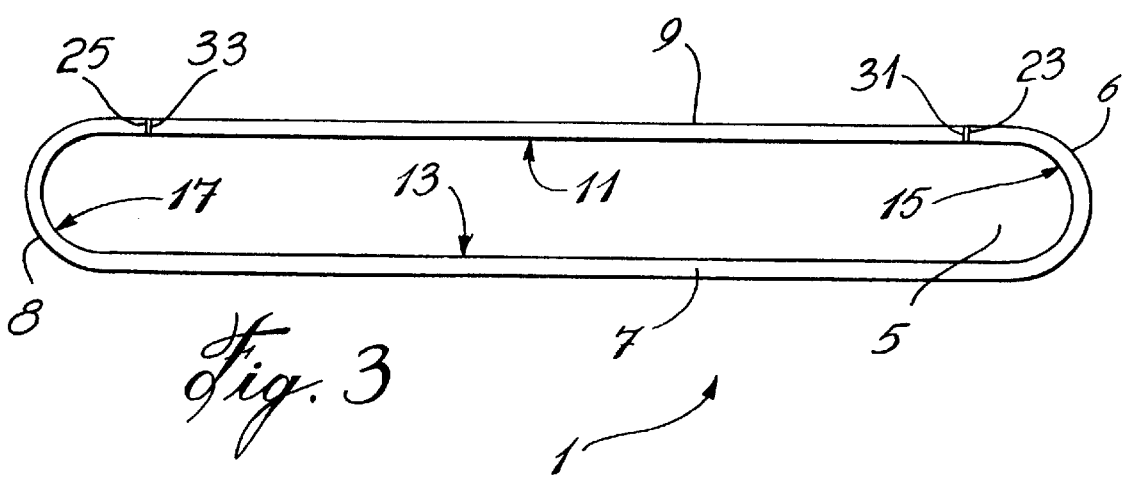
FIG. 3 is a schematic cross sectional view along view line 2—2 of FIG. 1 of an alternative arrangement of a louver.

FIG. 3 is a schematic cross sectional view of an alternative embodiment of the louver of FIG. 2. As may be seen, the first and second films 9, 7 do not overlap each other at their respective boundary edges 31, 33 and 23, 25. In order to accomplish this, the first and second film 9, 7 may be of a such dimensions, i.e. may be cut to such a width, so as to wrap about the louver body 5 without any overlap of their boundary edges. In accordance with this alternative embodiment, the respective boundary edges of the first and second film may abut one against the other so that the underlying louver body 5 does not show through the seam.

Figure 4:
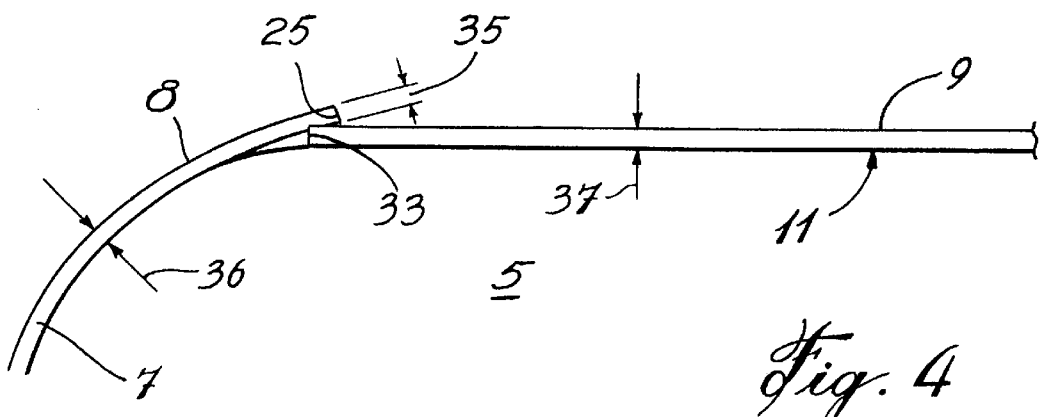
FIG. 4 is a closeup of the film applied to a surface of a louver body.
Figure 5:
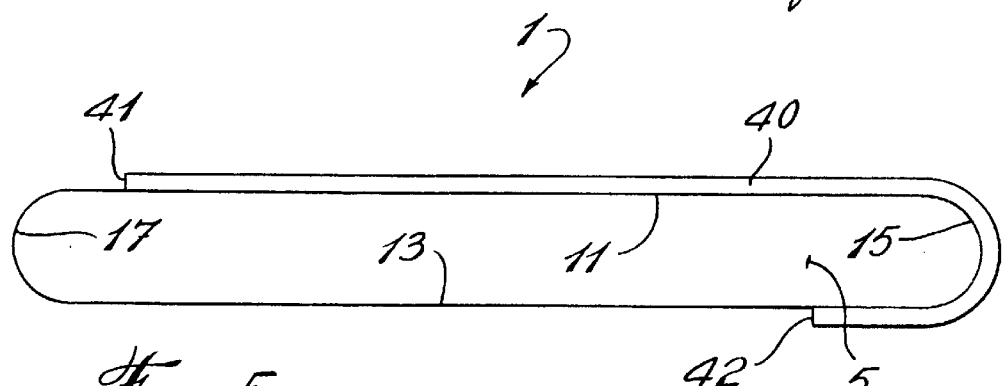
FIG. 5 is a schematic cross sectional view of an alternative arrangement of a film applied to a louver.

FIG. 4 is a close up of a film as applied to a surface of a louver body. In particular, there is shown the overlap of section 8 of second film 7 on top of the first film 9. The boundary edges 25 of second film 7 is show as having a thickness 35, i.e for example, 5 microns. Further, second film 7 is shown to have a thickness 36, i.e. for example of 5 microns. Finally, first film 9 is also shown as having a thickness 37, i.e. for example 5 microns thick. Alternatively, the thickness of the first film 9 and of the second film 7 may not be identical FIG. 5 is a schematic cross sectional view of an alternative arrangement of the film applied to the louver. As shown, louver body S is covered with a single film, namely film 40, having boundary edges 41 and 42, wherein film 40 is shown as having been applied to the top horizontal surface 11, to opposed side surface 15, and to a portion of lower horizontal surface 13. As explained above, the thickness of film 40 is approximately 5 microns, and therefore the boundary edges 41 and 42 are imperceptible to human touch, i.e. they are tactilely invisible.

Figure 6:
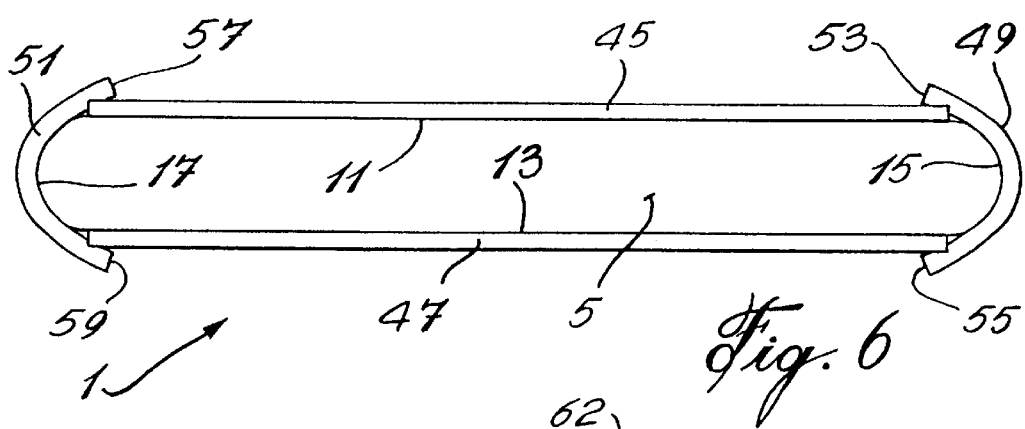
FIG. 6 is a schematic cross sectional view of a further alternative arrangement of a film applied to a louver.

FIG. 6 is a schematic cross sectional view of an alternative arrangement of a film applied to a louver. Louver 1, comprising louver body 5, is shown as having been covered with 4 separate films, namely first film 45, second film 47, third film 49, and fourth film 51. As may be seen, first film 41 is shown as having been applied to the top horizontal surface 11, second film 47 is shown as having been applied to the lower horizontal surface 13, third film 49 is shown as having been applied to the first opposed side surface 15, and fourth film 51 is shown as having been applied to the second opposed side surface 17. In accordance with this particular embodiment, the order of application of the films is such that first film 45 and second film 47 may have been applied first onto their respective surfaces, following which, third film 49 and fourth film 51 were applied to their respective surfaces. Therefore, the boundary edges 53 and 55 of third film 49 respectively overlap the boundary edges of first film 45 and second film 47, and the boundary edges 57 and 59 of fourth film 51 overlap the other boundary edges of first film 45 and second film 47. As discussed above, the thickness of each of the first second, third and fourth films may be approximately 5 microns, such that each of boundary edges 53, 55, 57 and 59 are imperceptible to human touch, i.e, tactilely invisible. In accordance with an alternative embodiment, however, the thicknesses of each of the films may be different, as long as they are each imperceptible to human touch.

Figure 7:
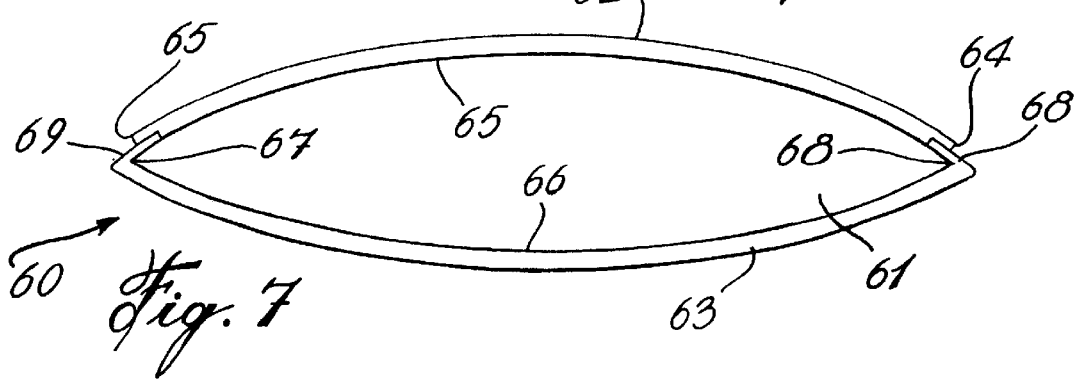
FIG. 7 is a cross sectional view of a film covered louver body having an elliptic cross sectional configuration.

FIG. 7 is a cross sectional view of a louver body having an elliptical cross sectional configuration. As may be seen, louver 60 comprises louver body 61 which is configured in an elliptical configuration, namely wherein top surface 65 and lower surface 66 meet at opposed ends 67 and 68. Louver body, 61 is shown as having been covered with 2 films, namely lower surface film 63 and top surface film 62. As may further be seen, lower surface film 63 has been applied first, such that lower surface 66 is covered, and such that lateral edges 68 and 69 partially overlap unto top surface 65. After lower surface film 63 has been applied to lower surface 66, the top surface film 62 may then be applied to top surface 65. Thus boundary edges 64 and 65 of top surface film 62 partially overlap the boundary edges of lower surface film 63.

Figure 8:
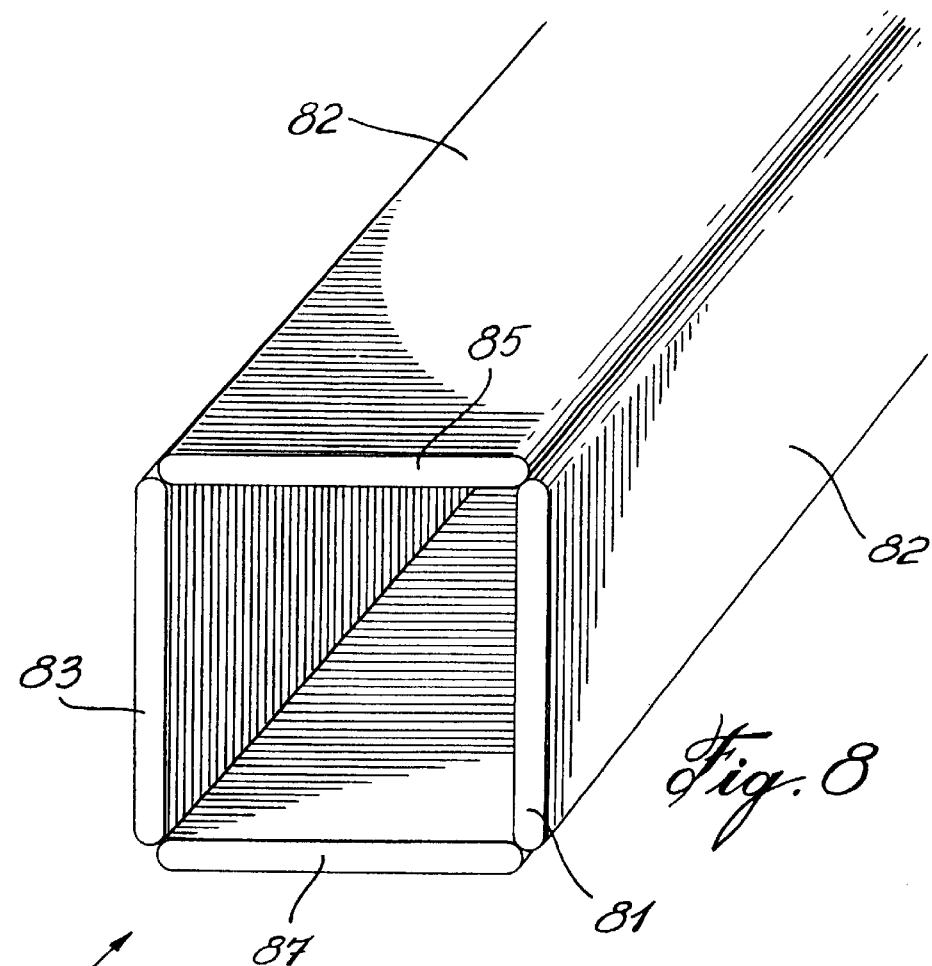
FIG. 8 is a perspective view of a bottom rail constructed using laminated louvers.

FIG. 8 is a perspective view of a bottom rail constructed using louvers. As shown, rail 80 is constructed with laminated louvers, but it is understood that rail 80 may also be constructed using louvers which may not be laminated. Rail 80 comprises four louvers, namely top louver 85, bottom louver 87, first side louver 81 and second side louver 83. Each of the four louvers is shown to be disposed such that it spaces apart each pair of adjacent louvers, and such that each side surface of a louver is connected to the side surface of an adjacent louver. As shown, the louvers are connected to each respective adjacent louver adjacent its side surfaces, however, the point of connection of the louvers may be disposed away from the side surfaces. Each louver may be connected to an adjacent louver through the use of an adhesive, such as glue.

As may be seen, the configuration of rail 80 is approximately that of an equal sided rectangular hollow box. As may further been seen, the surfaces of each of louvers 81, 83, 85 and 87, may have been covered i.e. laminated, with a film 82. It is understood that not all of the surfaces' of louvers 81, 83, 85 and 87 may be covered with a film, i.e. for example only the exterior facing surface of some or all of the louvers may be covered with a film.

Figure 9:
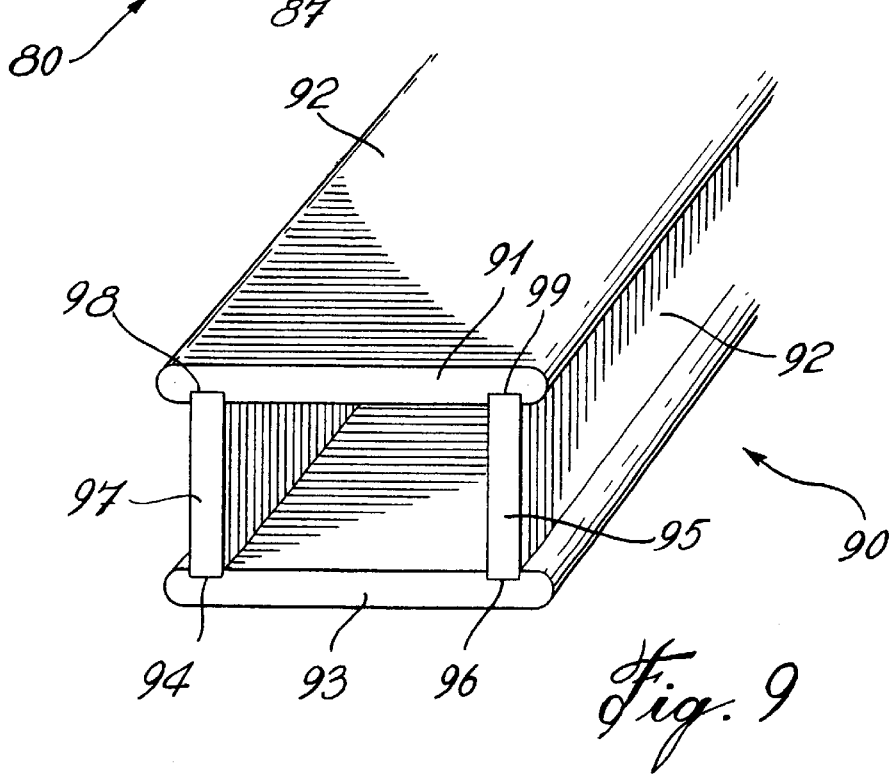
FIG. 9 is a perspective view of an alternative configuration of a bottom rail constructed using laminated louvers.

FIG. 9 is a perspective view of an alternative configuration of a bottom rail constructed using louvers, i.e. laminated or not. Rail 90 is thus shown as being constructed from laminated louvers 91 and 93, and from laminated louvers 95 and 97. As may be understood, laminated louvers 95 and 97 may in fact each be a fill sized louver (such as louver 91) having been cut into half, and which have had their rounded side surfaces cut off. Alternatively, louvers 95 and 97 may simply be a louver having a different configuration than louvers 91 and 93, for example, being of a reduced width and having truncated side surfaces. As may be seen, louver bodies 95 and 97 may be disposed in grooves 94 and 96 which may be disposed on a surface of louver 93. Further, louver 91 may also comprise grooves 98 and 99 which are configured and disposed so as to allow louvers 95 and 97 to sit therein. As may be seen, grooves 94, 96, 98 and 99 may be sized and configured to allow louver bodies 95 and 97 to fit snugly therein, i.e. such that they may require the application of some pressure to fit therein. Alternatively, the fit of louver bodies 95 and 97 into grooves 94, 96, 98 and 99 may be accomplished through the use of an adhesive, such as glue.

Although not shown, rail 90 may be fitted at each or its end extremities with a appropriately sized end element, i.e. such as a piece of louver, such that the end extremities may be closed off. Said end elements may be laminated with a film in order to be consistent with the rest of the rail 90. Rail 90 may be constructed with louvers which are laminated with a film 92, or not laminated at all. As may be understood, all of the surfaces of each of louvers 91, 93, 95 and 97 may be laminated with a film 92 or alternatively only some of the surfaces of said louvers may be laminated, for example, the outwardly facing surfaces.

FIG. 10 is a perspective schematic view of an apparatus 99 for laminating film onto a louver. The apparatus comprises a forming station for the application of a film onto a louver body generally designated by the reference number 101, and a delivery station for continuously supplying one or more films to be laminated onto the louver, generally designated by the reference number 102. The delivery station 102, comprises a top feeder 200 for continuously feeding a film 101 to be applied to the louver 100. In addition, the delivery station 102 comprises a bottom feeder 201 which may continuously feed a film 112 to laminate the louver 100.

The forming station 101 may be generally disposed downstream from the delivery station 102, i.e. in the direction of motion arrow 109. The forming station may comprise a top roller 107, which top roller may be disposed such that it is positioned above the louver 100, and may therefore transfer the design coating of film 101 onto the top horizontal surface 102 of louver 100. Forming station 101 further comprises bottom roller 111, which bottom roller 111 may be disposed such that it is positioned below louver 100, and may therefore transfer the design coating of film 112 onto the bottom horizontal surface (not shown) of louver 100. As shown in FIG. 10, bottom roller 111 is disposed slightly forward (i.e. in the direction of motion arrow 109) from top roller 107, however it is understood that said disposition can be inverted, or even such that the top roller 107 and bottom roller 111 may be aligned with each other.

As may be understood, a louver 100 may be introduced into the apparatus for laminating a louver 99 at the extremity shown in FIG. 10. The louver 100 may then be made to be advanced in the direction of motion arrow 109 by advancing means (not shown). For example, louver 100 may be advanced into the apparatus for laminating 99 directly after louver 100 has been extruded from an extrusion machine, (not shown). Alternatively, louver 100 may be made to be advanced through the laminating apparatus 99 by other means.

It is understood that the apparatus for laminating film onto a louver 99 may comprise different configurations of the delivery station 102 and of the forming station 101. Forming station 101 in particular may have a number of configurations depending on the applications. For example, if louver 100 is to be laminated on only one surface, for example, the top horizontal surface, only a top feeder 200 may be used, or alternatively, the bottom feeder 201 may not be made to be operational, i.e. it may not dispense a film.

Forming station 107, in addition to the top rollers and bottom roller 111 may further comprise a plurality of pairs of opposed angled rollers namely pair of rollers 120*a* and 120*b*, pair of rollers 121*a* and 121*b*, pair of rollers 122*a* and *b*, and pair of rollers 123*a* and *b*. These pairs of rollers may be disposed downstream from the top roller 107 and the bottom roller 111. The pairs of rollers are shown to be disposed opposite each other, in a generally aligned position, although it is understood that they may be staggered. Further, there is shown 4 pairs of opposed rollers, although it is understood that there may be more pairs of rollers, i.e. 5 or more pairs, or fewer that 4, for example, 2 pairs. As may be further explained, these plurality of pairs of opposed angled rollers are configured and disposed such that they may effect the lamination of one, or both of film 101 and film 112 onto the side surfaces of louver 100.

Although not shown, apparatus 99 may comprise a number of supports, frames, advancing means, controls, and other necessary equipment in order to effect the purpose thereof.

FIG. 11 is close up side elevation view of top roller 107. As may be understood, film 101 is shown as having been paid of from top feeder roller 200 (not shown) such that it is brought into close proximity, or even into contact with the top surface 102 of louver 100. As may be seen, film 101 comprises a temporary polyester carrier 103 and a design coating 105. The louver 100 is made to be displaced in the direction of motion arrow 109 such that top roller 107 causes film 101, and particularly design coating 105 to be pressed down firmly onto top surface 102 of louver 100 such that said design coating 105 is transferred thereto. The temporary polyester carrier 103 is pulled of and away from the design coating 105 after the film 101 has passed through roller 107. As may be understood, FIG. 11 is a schematic view, wherein the components depicted therein are not to scale. In particular, the vertical scale of design coating 105 has been exaggerated.

FIG. 12 is a close up side elevation view of the bottom roller 111. Film 112 has been paid off from the bottom feed roller 201 (not shown) such that it may be brought into close proximity to the bottom horizontal surface 104 of louver 100 such that when the louver and film 112 are advanced in the direction of motion 109, the design coating 113 of film 112 is caused by bottom roller 111 to be tansferred from film 112 onto the bottom horizontal surface 104 of louver 100.

FIG. 13 is a sectional view of the louver along view lines 13—13 of FIG. 12, showing a cross section of the louver immediately after the application of film 101 and film 112 onto the top horizontal surface 102 and bottom horizontal surface 104 respectively of louver 100. As may be seen, the width of design coating 105 as applied to the top horizontal surface 102 is narrower than the overall width of louver 100. Alternatively, design coating 113 as applied to the lower horizontal surface 104 of louver 100 is shown to be wider than the overall width of louver 100. Namely portions 115 and 116 of design coating 113 are shown to overlap the side of louver 100. It is understood that portions 115 and 116 are to be of sufficient width so as to be able to wrap around and be applied to opposed first and second side surfaces 106 and 108 respectively of louver 100. As may be further seen temporary polyester carrier film 115 has yet to be peeled away from film 112.

FIG. 14 shows a top plan view of forming station 101 showing the pairs of opposed rollers 120 *a, b.,* 121 *a, b.,* 122 *a, b.,* and 123 *a, b.* As may be seen, the louver 100 is displaced in the direction of motion arrow 109, and the top surface 102 of louver 100 has had applied with first film 105. As well, there is shown second film 113 as having been applied to the lower horizontal surface of louver 100, and further showing portions 115 and 116 of said second film 113 which overhang the lower horizontal surface of louver 100. As the louver 100 is displaced in the direction of motion arrow 109, first pair of opposed rollers 120 a and 120 b cause sections 115 and 116 of second film 113 to be partially wrapped around the round side surfaces of louver 100. Further, as the louver body 100 is further displaced in the direction of motion arrow 109, second pair of opposed rollers 121 a and 121 b further cause sections 115 and 116 of second film 113 to be further wrapped around and transferred onto side surfaces of louver 100. The same process is repeated by opposed rollers 122 a and 122 b and further completed by opposed rollers 123 a and 123 b. It is understood that forming station 101 may comprise more or less rollers than shown in FIG. 14, depending on the application.

Figure 15:
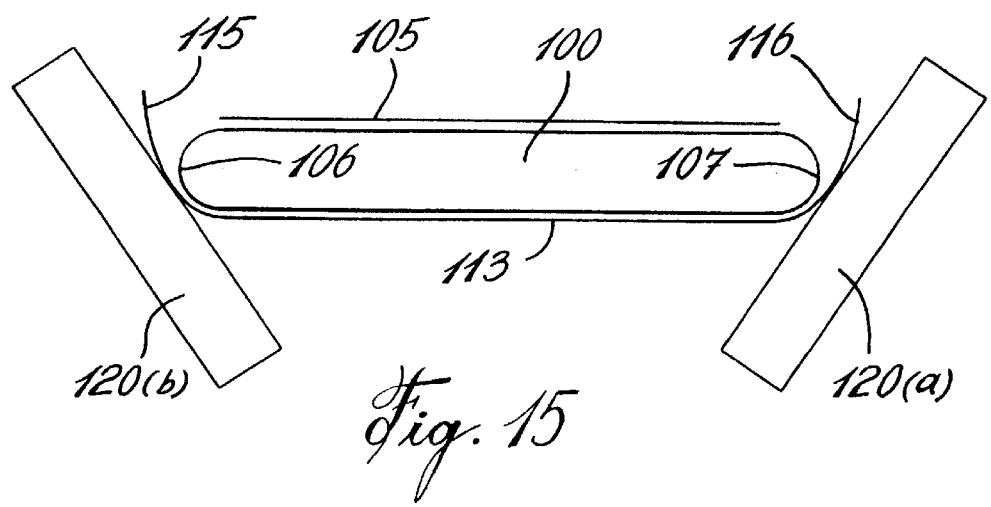
FIG. 15 is a cross sectional view of a louver along view line 15—15 of FIG. 14.

FIG. 15 is a cross sectional view of louver 100 along view line 15—15 of FIG. 14, As may be seen, FIG. 15 shows opposed rollers 120 a and 120 b which are angled at such an angle which causes section 115 and 116 of section film 113 to be partially wrapped around opposed first and second sides surfaces 106 and 107 of louver body 100.

Figure 16:
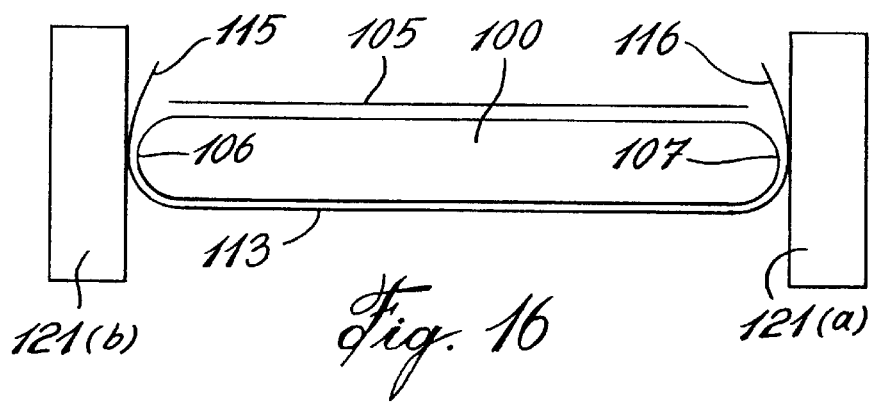
FIG. 16 is a cross sectional view of a louver along view line 16—16 of FIG. 14.

FIG. 16 is a cross sectional view of louver 100 along view line 16—16 of FIG. 14. As may be seem, FIG. 16 shows the pair of opposed roller 121 a and 121B which are further angled at an angle such that the portion 115 and 116 of second film 113 are further wrapped along opposed first and second side surfaces 106 and 107. As may be seem by comparing FIGS. 15 and 16, portions 115 and 116 are further wrapper along such that more side surface 106 and 107 are covered.

Figure 17:
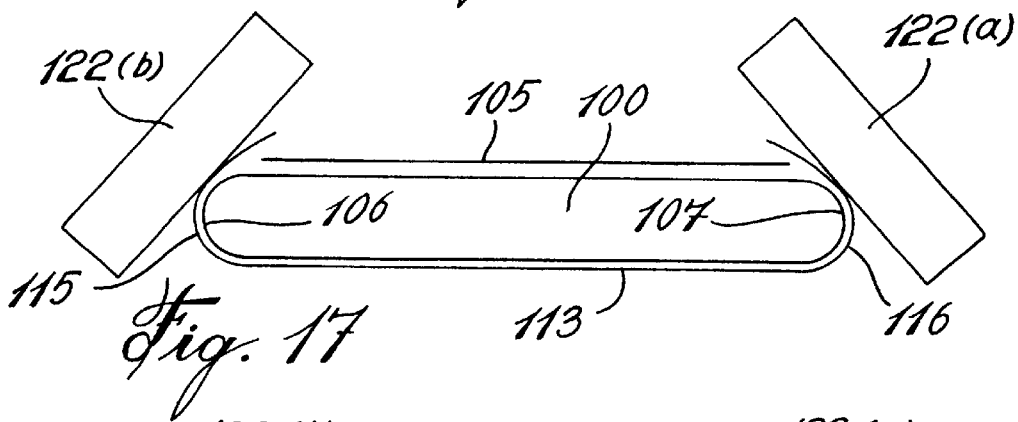
FIG. 17 is a cross sectional view of a louver along view line 17—17 of FIG. 14.
Figure 18:
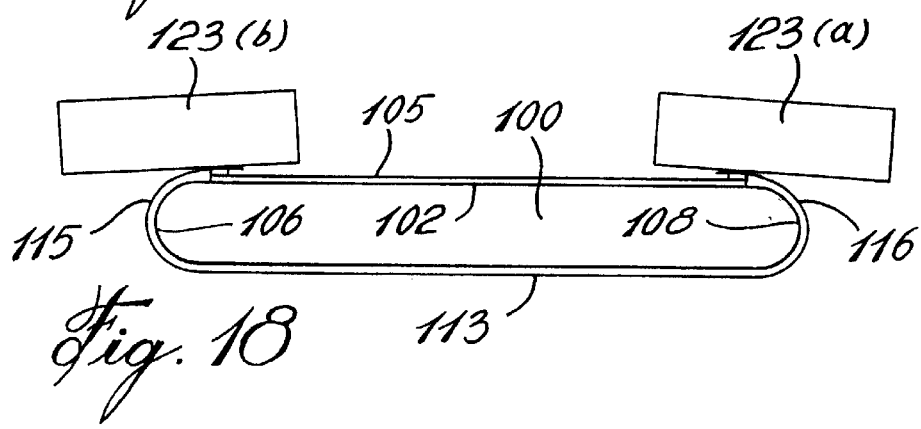
FIG. 18 is a cross sectional view of a louver along view line 8—18 of FIG. 14.

FIG. 17 is cross sectional view along view lines 17 of FIG. 14. FIG. 17 shows opposed rollers 122 A and 122 B further showing how sections 115 and 116 of second film 113 are further applied to side surfaces 106 and 107 of louver 100. FIG. 18 is a cross sectional view along view lines 18 of FIG. 13. FIG. 18 shows opposed pair of rollers 123 A and 123 b further showing how sections 115 and 116 of second film 113 are made to be applied to opposed side surfaces 106 and 108 and to first film 105.

FIG. 18 is cross sectional view along view line 18—18 of FIG. 14. FIG. 18 shows opposed rollers 123 a and 123 b further showing how sections 115 and 116 of second film 113 are further applied to side surfaces 106 and 107 of louver 100.

Figure 19:
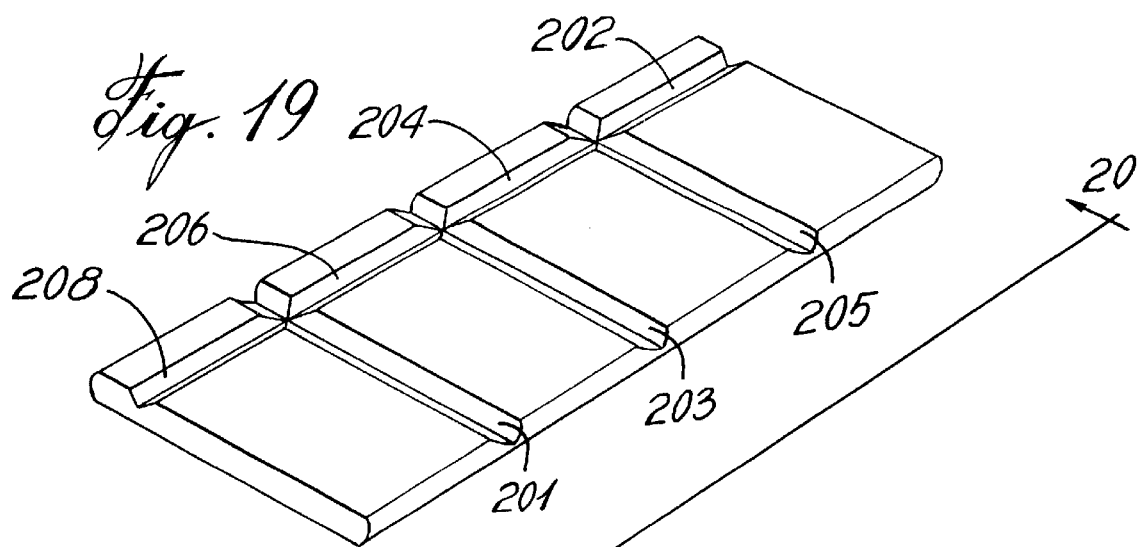
FIG. 19 is a perspective view of a pre-cut section of a louver to be used in the construction of a tassel.

FIG. 19 is a perspective view of a precut section of a louver 200, to be used in the construction of a tassel. As may be seen, louver 200 comprises a groove 202, 204, 206, and 208 which may have been cut on a surface thereof adjacent one of the lateral edges thereof, in a direction parallel to the longitudinal axis of the louver. Further, louver 200 may comprise a number of cuts on the same surface, namely cuts 201, 203 and 205, ideally of a depth sufficient so as to form a hinge at these locations.

Figure 20:
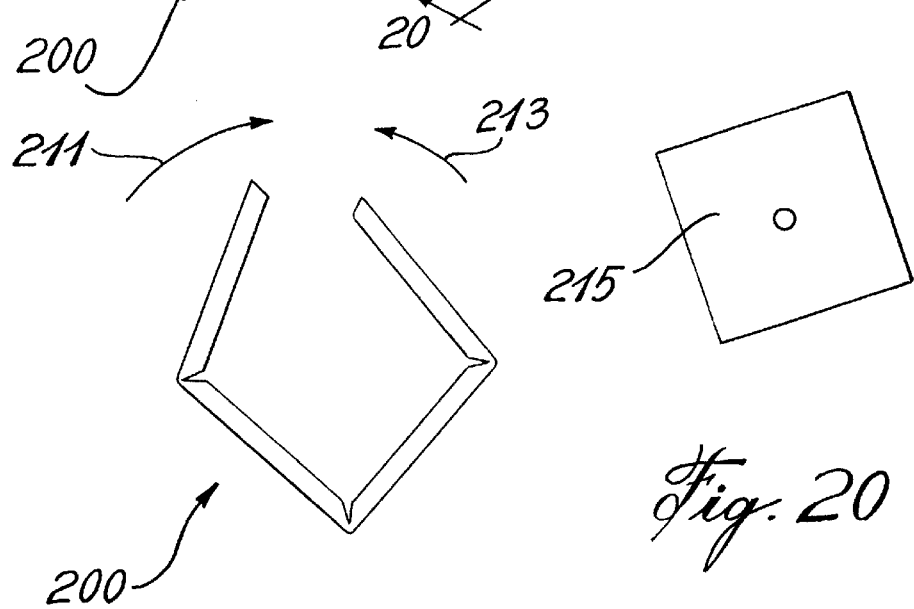
FIG. 20 is an elevation view along view lines 20—20 of FIG. 19, showing a tassel being assembled.

FIG. 20 is a elevation view along view lines 20—20 of FIG. 19, sowing a tassel being assembled, namely by folding the louver along its cuts so that the tassel closes upon itself in the direction of motion arrows 211 and 213. Prior to completely closing the tassel, an end piece 215 may be fitted into grooves 202, 204, 206, 208 (not shown, but may be seen in FIG. 19) so as to block off one of the extremities of the completed tassel.

Figure 21:
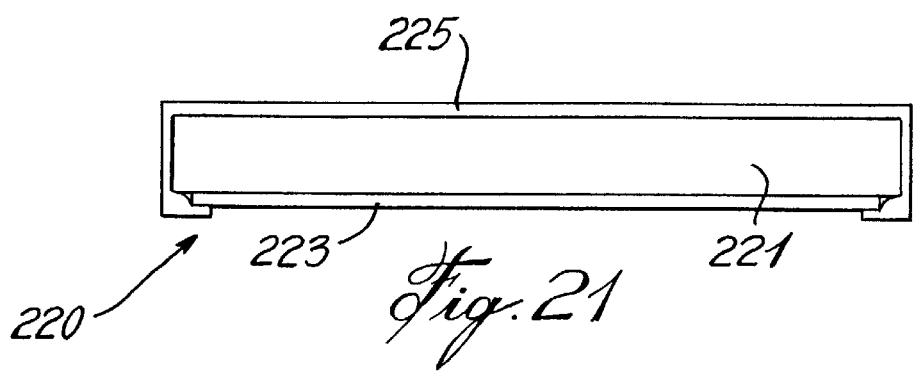
FIG. 21 is a schematic cross sectional view of an alternative embodiment of a louver.

FIG. 21 is a schematic cross sectional view of an alternative embodiment of a louver, as per FIG. 2. As may be seen, louver 220 comprises a rectangularly shaped louver body 221, being laminated with two films, namely first film 223 shown as having been laminated first, and second film 225 shown having been laminated second.

We claim:

1. A louver for use in a blind, the louver comprising:

an elongated louver body having opposite first and second major surfaces separated by opposite elongated side surfaces;

a first elongated flexible wrapping film sheeting and adhering on at least the first major surface of the louver body, the first film having opposite elongated boundary edges and a uniform thickness of 25 microns or less;

a second elongated flexible wrapping film sheeting and adhering on at least the second major surface of the louver body, the second film having opposite elongated boundary edges and a uniform thickness of 25 microns or less;

whereby one of the boundary edges of the first film and one of the boundary edges of the second film are disposed in an overlapping arrangement, the major surfaces and the opposite side surfaces of the louver body being completely sheeted by the first and second films, and wherein said boundary edges in said overlapping arrangement are tactilely invisible.

2. A louver according to claim 1, wherein one face of the first film and one face of the second film comprise a heat activated adhesive coating.

3. A louver according to claim 1, wherein one face of the first film and one face of the second film comprise a pre-printed design.

4. A louver according to claim 1, wherein the first and second films have a thickness between 1 and 25 microns.

5. A louver according to claim 1, wherein the first and second films have a thickness between 2 and 8 microns.

6. A louver according to claim 5, wherein the first and second films have a thickness of 5 microns.

7. A louver according to claim 1, wherein the louver body is made of polymeric material.

8. A louver according to claim 7, wherein the louver body comprises polyvinyl chloride (PVC).

9. A louver according to claim 2, wherein said first elongated flexible wrapping film, when applied to said at least the first major surface of the louver body, is of a thickness of between 2 to 8 microns.

10. A louver according to claim 2, wherein said first elongated flexible wrapping film, when applied to said at least the first major surface of the louver body, is of a thickness of 5 microns.

11. A louver according to claim 2, wherein said second elongated flexible wrapping film, when applied to said at least the second major surface of the louver body, is of a thickness of between 2 to 8 microns.

12. A louver according to claim 2, wherein said second elongated flexible wrapping film, when applied to said at least the second major surface of the louver body, is of a thickness of 5 microns.

13. A louver according to claim 1 wherein each of the boundary edges of the first film are disposed with respect to a respective boundary edge of the second film in a said overlapping arrangement.

14. A louver for use in a blind, the louver comprising:

an elongated louver body having opposite first and second major surfaces separated by opposite elongated side surfaces;

a first elongated flexible wrapping film sheeting and adhering on at least the first major surface of the louver body, the first film having opposite elongated boundary edges and a thickness between 1 and 25 microns;

a second elongated flexible wrapping film sheeting and adhering on at least the second major surface of the louver body, the second film having opposite elongated boundary edges and a thickness between 1 and 25 microns;

whereby one of the boundary edges of first film and one of the boundary edges of the second film are disposed in an overlapping arrangement, the other of the boundary edges of first film and the other of the boundary edges of the second film are disposed in an overlapping arrangement, the major surfaces and the opposite side surfaces of the louver body being completely sheeted by the first and second films.

15. A louver according to claim 14, wherein the first and second films have a thickness between 2 and 8 microns.

16. A louver according to claim 15, wherein the first and second films have a thickness of 5 microns.

* * * * *